United States Patent [19]
Ullrich et al.

[11] 3,963,679
[45] June 15, 1976

[54] PROCESS FOR THE PRODUCTION OF POLYURETHANE ELASTOMERS

[75] Inventors: Martin Ullrich; Ernst Meisert, both of Leverkusen; Alfred Eitel, Dormagen, all of Germany

[73] Assignee: Bayer Aktiengesellschaft, Leverkusen, Germany

[22] Filed: July 17, 1974

[21] Appl. No.: 489,204

Related U.S. Application Data
[63] Continuation-in-part of Ser. No. 433,589, Jan. 15, 1974, abandoned.

[30] Foreign Application Priority Data
Jan. 19, 1973  Germany............................ 2303564

[52] U.S. Cl..................... 260/75 NE; 260/77.5 AA; 264/211
[51] Int. Cl.².................... C08G 18/08; D01F 6/26
[58] Field of Search................ 260/75 NE, 77.5 AA; 264/211

[56] References Cited
UNITED STATES PATENTS

| | | | |
|---|---|---|---|
| 3,121,914 | 2/1964 | Olson et al.......................... | 264/211 |
| 3,192,185 | 6/1965 | Achterhof et al. ............. | 260/75 NE |
| 3,725,340 | 4/1973 | Erdmenger et al. ........ | 260/77.5 AA |

OTHER PUBLICATIONS

BiKales, Encyclopedia Reprints: "Extrusion etc.," Wiley–Interscience (1971) pp. 43–47.

*Primary Examiner*—H.S. Cockeram
*Attorney, Agent, or Firm*—Joseph C. Gil; Gene Harsh

[57] ABSTRACT

The instant invention is directed to the discovery that it is now possible to obtain high quality, elastomeric polyurethanes or polyureas, even when using highly reactive diamines as chain lengthening agents, without the formation of unwanted irregularities, if the mixture of reactants is exposed to a high velocity gradient by means of vigorously mixing kneading elements at an early phase of the reaction while the viscosity of the reaction mixture is still low. Generally, the viscosity is kept between 100 and 1000 poises and preferably between 200 and 700 poises during the action of the high velocity gradient.

17 Claims, 7 Drawing Figures

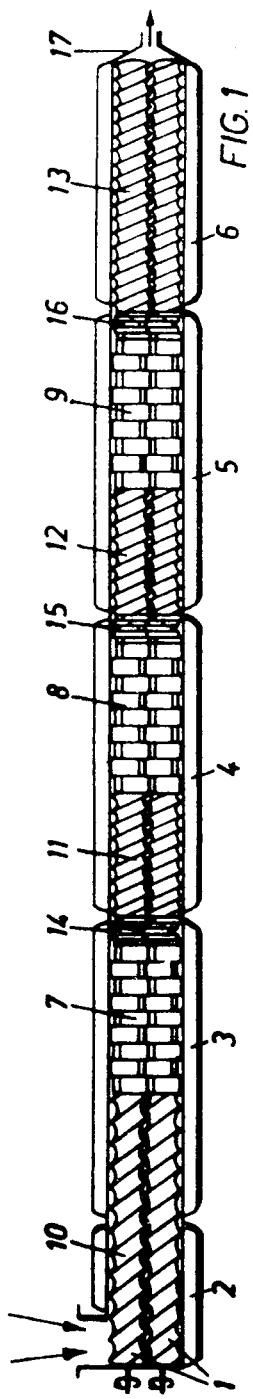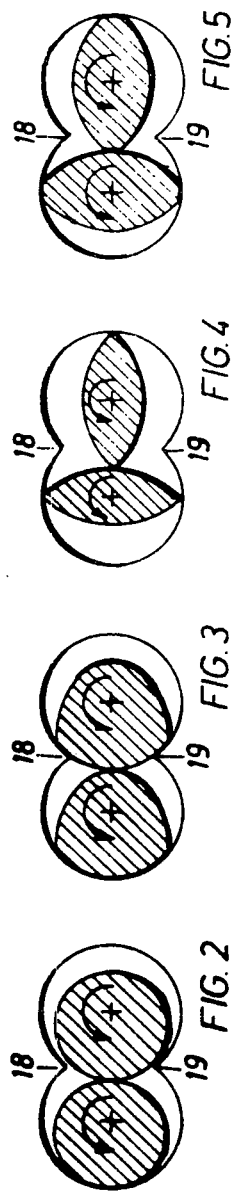

3,963,679

PROCESS FOR THE PRODUCTION OF POLYURETHANE ELASTOMERS

This application is a continuation-in-part of U.S. application Ser. No. 433,589, filed Jan. 15, 1974, now abandoned.

BACKGROUND OF THE INVENTION

Elastic synthetic resins made from polyisocyanates, polyhydroxyl compounds and, optionally, chain-lengthening agents are already shown. They have been described in detail in Kunststoff-Handbuch, Volume VII, Vieweg-Hochtlen, Carl-Hanser-Verlag. Many of these polyurethane elastomers can be converted into their final shape by a subsequent forming process, for example, shaped products can be produced by injection molding or by extrusion. Other methods of manufacturing shaped products include casting the reactants in molds or pressing polyurethane elastomers which can be rolled. For the continuous manufacture of panels, foils, tubes, cable sheaths and profiles, however, the main process is extrusion of thermoplastic polyurethane elastomers. These thermoplastic polyurethane elastomers are obtained by reacting polyesters or polyether diols and glycols, such as butane-1,4-diol, with approximately stoichiometric quantities of diisocyanates. This reaction must be carried out under accurately controlled reaction conditions. Apparatus for carrying out the reaction has been described, for example, in German Auslegeschrift No. 1,147,772 according to which the reactants, after they have been vigorously mixed, are introduced in accurately measured quantities into a preheated liquid bath in which they are reacted and after the reaction the products are purified and granulated and only after these stages of the process can the products be extruded to produce the finished moldings.

According to another process which is carried out in practice the reactants, which consist of polyester, butane diol and polyisocyanate, are fed into a mixing head from dosing pumps. From this mixing head, the reacting components are delivered onto a conveyor belt of polytetrafluoroethylene on which they are passed through an oven in which they are heated to temperatures of 100°C. After several hours, the material is cut up into strips and then tempered for 24 hours at 100°C under nitrogen. Only after this time can the products be worked up in injection molding or extrusion apparatus.

According to German Auslegeschrift No. 1,106,969, thermoplastic polyurethane elastomers are obtained by stirring stoichiometric quantities of starting components consisting of polyester, butane-1,4-diol and isocyanate for one minute, reacting them together and then pouring them into large containers which are then screwed down and heated to 140°C in an oven for 3½ hours. After cooling, the product is granulated and then worked up in extruders.

According to German Auslegeschrift No. 1,165,852, polyurethane elastomers which are capable of being thermoplastically formed may also be produced by mixing the reactants at temperatures of between 60° and 135°C and then solidifying the reaction mixture by pouring it on to heated metal sheets which have been coated with mold parting agents. The reacting substance is distributed over the sheet in good time so that it can subsequently be more easily detached from it. The resulting thermoplastic polyurethane compounds which are stable in storage must be reduced in size by cutting, shredding and grinding them and must finally be shaped by injection molding, extrusion or pressure molding.

The conventional processes of this kind are therefore based on working up polyurethane granulates which must be produced by complicated processes.

All attempts to obtain technically high-quality polyurethane elastomers directly from the starting components by simultaneously reacting and extruding them in screw extruders, i.e. without first producing a granulate, have so far failed. Thus for example, in U.S. Pat. No. 3,642,964 there is described a continuous one-step process for the production of thermoplastic polyurethanes in which a. a diisocyanate, a polymeric diol, a difunctional chain-lengthening agent and a catalyst are mixed in a first zone;
b. the reaction mixture is then passed through a second zone in which it is mixed under the action of high shearing forces; and
c. the reaction mixture is finally continuously transferred to a forming zone in which it is formed by extrusion.

The particular feature of this process is that the temperature of the reaction mixture is adjusted so that as the reaction mixture passes through the various zones, its viscosity remains practically constant in the region of about 1000 to 10,000 Poises in all the zones.

It has been found that homogeneous products free from lumps can not be obtained by the process according to U.S. Pat. No. 3,642,964. This is in particular true if one tries to produce high-molecular weight polyureas on a technical scale by a solvent-free reaction from polyisocyanates and diamines and/or polyamines.

It has even not been possible yet to obtain undiluted high-molecular weight, elastomeric polyurethane ureas from liquid polyisocyanates and aliphatic, cycloaliphatic and/or araliphatic polyamines by the usual processes because the reaction between the aliphatic amino groups and isocyanate groups is so vigorous that the reactants cannot be homogeneously mixed before the reaction product solidifies. These polyureas have therefore in the past always been prepared as very dilute solutions. This means that either a large quantity of solvent must be transported with the reaction product from its point of production to the point where it is processed or production of the polyurea must be followed by an additional step of evaporation which involves considerable expenditure.

SUMMARY OF THE INVENTION

It has now surprisingly been found, however, that it is possible to obtain molten high-quality, elastomeric polyurethane(ureas), even when using highly reactive diamines as chain-lengthening agents, without the formation of unwanted irregularities if the mixture of reactants is exposed to the action of a high velocity gradient by means of vigorously mixing kneading elements at an early phase of the reaction while the viscosity of the reaction mixture is still low, namely between about 100 and 1000 Poises, preferably 200 and 700 Poises. Kneading zones in later phases of the reaction are only of minor importance.

This invention relates to a process for the continuous production of elastomeric polyurethane(urea)s by reaction of diisocyanates and optionally polyisocyanates, glycols which have a molecular weight of up to 300 and/or aliphatic, cycloaliphatic and/or araliphatic primary or secondary diamines and optionally other compounds which contain an average of at least 1.8 Zerewitinoff-active groups optionally in the presence of lubricants in self-cleaning two-shaft extruders with both screw shafts rotating in the same direction, the reaction being carried out at temperatures of between 90° and 280°C and within a viscosity range of about 0.1 to 3000 Poises during the reaction in the screw extruder, which process is characterized in that in order to obtain a homogeneous end product free from lumps, the critical reaction phase, in which the reaction mixture is very sticky and has a viscosity of between about 100 Poises and 1000 Poises takes place in a zone of the extruder which contains vigorously mixing kneading elements with kneading frequencies of between 1 and 20 Hertz and a velocity gradient in the radial clearance between screw and wall of housing of more than 2000 $\sec^{-1}$.

If the conditions according to the invention are observed when carrying out the process, it is possible to obtain a homogeneous product which is free from the gel particles and lumps which invariably occur when polyurethane elastomers are synthesized in screw extruders without the measures provided by the invention. Due to the heat produced by the exothermic reaction and the heat of friction produced in the screw extruder, the polyurethane (urea) elastomer which is being produced remains in a thermoplastic state so that it can easily be shaped at the same time at the end of the extruder. Optionally heat may be applied externally to the machine housing. In this new process it is no longer necessary to cast the reactants onto sheets or the like and then size-reduce them or to supply additional heat during a subsequent shaping process.

BRIEF DESCRIPTION OF THE DRAWING

FIG. 1 is a schematic of an extruder suitable for practicing the process of the invention.

FIGS. 2 through 7 are cross-sections of a typical extruder showing kneading elements suitable for use in the practice of the invention.

DETAILED DESCRIPTION

Generally, the starting materials suitable for use in the process of the invention are those conventionally employed in the art in the production of polyurethane elastomers.

More specifically, however, starting materials used for carrying out the process according to the invention are known aliphatic, cycloaliphatic, araliphatic, aromatic or heterocyclic diisocyanates of the kind described e.g. by W. Siefken in Justus Liebigs Annalen der Chemie, 562, pages 75 to 136, for example ethylene diisocyanate, tetramethylene-1,4-diisocyanate, hexamethylene-1,6-diisocyanate, trimethyl hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (DAS 1 202 785), hexahydrotolylene-2,4- and -2,6-diisocyanate and any mixtures of these isomers, perhydrodiphenylmethane-2,4'- and/or -4,4'-diisocyanate, phenylene-1,3- and -1,4-diisocyanate, tolylene-2,4- and -2,6-diisocyanate and any mixtures of these isomers, diphenylmethane-2,4'- and/or -4,4'-diisocyanate, 4,4'-diisocyanatodiphenylpropane, 3,3'-dimethyl-4,4'-diisocyanatodiphenylmethane, 3,3'-dimethoxy-4,4'-diisocyanatodiphenylmethane, 4,4'-diisocyanatodiphenyl, 1,5-diisocyanatonaphthalene and diisocyanates which are obtained by telomerisation as described, for example, in Belgian Pat. No. 723,640.

The above mentioned diisocyanates may be used together with a polyisocyanate in amounts which may be up to 15 mols-% (based on the diisocyanate) but must be sufficiently low to ensure that the polyurea discharged from the screw extruder will still be in a fusible or thermoplastic state. If a substantial quantity of higher functional isocyanates is used, this must generally be compensated by adding hydroxyl and or amino compounds which have an average functionality of less than 2 in order to prevent excessive chemical crosslinking of the product delivered from the screw extruder. It is, of course, possible to carry out the reaction in such a way that chemical crosslinking of the elastomer subsequently takes place during storage (e.g. by using an excess of compounds which contain NCO-groups). The following are examples of suitable higher-functional isocyanates: triphenylmethane-4,4',4''-triisocyanate, polyphenyl-polymethylene polyisocyanates which can be obtained by aniline-formaldehyde condensation followed by phosgenation and which have been described e.g. in British patent specification Nos. 874,430 and 848,671, perchlorinated aryl polyisocyanates of the kind described e.g. in German Auslegeschrift 1,157,601, polyisocyanates which contain carbodiimide groups as described in German Pat. No. 1,092,007, the diisocyanates described in U.S. Pat. No. 3,492,330, polyisocyanates which contain allophanate groups as described e.g. in British Patent specification No. 994,890, Belgian Pat. No. 761,626 and published Dutch Pat. No. 7,102,524 polyisocyanates which contain isocyanurate groups as described e.g. in German Pat. Nos. 1,022,789, 1,222,067 and 1,027,394 and in German Offenlegungsschriften 1,929,034 and 2,004,048, polyisocyanates which contain urethane groups as described e.g. in Belgian Pat. No. 752,261 or in U.S. Pat. No. 3,394,164, polyisocyanates which contain acylated urea groups according to German Pat. No. 1,230,778, polyisocyanates which contain biuret groups as described e.g. in German Pat. No. 1,101,394, in British patent specification No. 889,050 and in French Pat. No. 7,017,514, polyisocyanates which are prepared by telomerisation reactions as described e.g. in Belgian Pat. No. 723,640, polyisocyanates which contain ester groups as described e.g. in British patent specification Nos. 965,474 and 1,072,956, in U.S. Pat. No. 3,567,763 and in German Pat. No. 1,231,688, and reaction products of the above mentioned isocyanates with acetals in accordance with German Pat. No. 1,072,385.

The distillation residues which are obtained from the commercial production of isocyanates and which still contain isocyanate groups may also be used, optionally dissolved in one or more of the above mentioned polyisocyanates. Any mixtures of the above mentioned polyisocyanates may also be used.

In the process according to the invention, the diisocyanates and optionally polyisocyanates are preferably reacted, either before or during the reaction with the glycols and/or diamines, with other, preferably higher-molecular weight compounds with molecular weights of 500 to 10,000 which contain an average of at least 1.8 preferably at least 2 Zerewitinoff-active groups per molecule. These compounds used according to the invention which contain Zerewitinoff-active groups may be compounds which contain amino groups, thiol groups or carboxyl groups but are preferably polyhydroxyl compounds, in particular those with an average of 1.8 to 8 hydroxyl groups and especially those with a molecular weight of 500 to 10,000, preferably 600 to 6000, more preferably 800 to 3500, e.g. polyesters, polyethers, polythioethers, polyacetals, polycarbonates and polyester amides which contain at least, generally 2 to 8 but preferably 2 to 4 hydroxyl groups, of the kind which are known per se for the production of polyurethanes.

Suitable polyesters which preferably contain primary hydroxyl groups include e.g. the reaction products of polyhydric alcohols, preferably dihydric alcohols with the optional addition of trihydric alcohols, and polybasic, preferably dibasic carboxylic acids.

Instead of free polycarboxylic acids, the corresponding polycarboxylic acid anhydrides or polycarboxylic acid esters of lower alcohols or mixtures thereof may be used for producing the polyesters. The polycarboxylic acids may be aliphatic, cycloaliphatic, aromatic and/or heterocyclic and may be substituted, e.g. with halogen atoms, and/or unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and bis-glycol terephthalate. Suitable polyhydric alcohols are e.g. ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis-hydroxymethyl cyclohexane), 2-methyl-propane-1,3-diol, glycerol, trimethylolpropane, hexane-1,2,6-triol, butane-1,2,4-triol, trimethylolethane, pentaerythritol, diethylene glycol, triethylene glycol, tetraethylene glycol, polyethylene glycols, dipropylene glycol, polypropylene glycols, dibutylene glycol and polybutylene glycols. The polyesters may also contain carboxyl end groups. Mono and polyesters of lactones which contain an average of more than 1.8 hydroxyl groups, e.g. $\epsilon$-caprolactone or hydroxycarboxylic acids such as $\omega$-hydroxycaproic acid may also be used.

The polyethers used according to the invention which contain at least two, generally two to eight and preferably two or three hydroxyl groups are also known per se and may be prepared e.g. by the polymerisation of epoxides such as ethylene oxide, propylene oxide, butylene oxide, tetrahydrofuran, styrene oxide or epichlorohydrin, each with itself, e.g. in the presence of $BF_3$, or by addition of these epoxides, optionally as mixtures or successively, to starter components which contain reactive hydrogen atoms such as alcohols or amines, e.g. water, ethylene glycol, propylene-1,3- or -1,2-glycol, trimethylolpropan 4,4'-dihydroxydiphenylpropane, aniline, ammonia, ethanolamine or ethylene diamine. A certain proportion of sucrose polyethers such as those described in German Auslegeschriften 1,176,358 and 1,064,938 may also be used according to the invention. It is frequently preferred to use polyethers which contain predominantl primary OH-groups (up to 90% by weight, based on all the OH-groups present in the polyether). Polyethers which are modified with vinyl polymers, for example the polyethers which can be obtained by polymerising styrene and acrylonitrile in the presence of polyethers (U.S. Pat. Nos. 3,383,351, 3,304,273, 3,523,093 and 3,110,695 and German Pat. No. 1,152,536) and polybutadienes which contain OH-groups are also suitable.

Among the polythioethers there should be particularly mentioned the condensation products of thiodiglycol with itself and/or with other glycols, dicarboxylic acids, formaldehyde, aminocarboxylic acids or amino alcohols. The products obtained are either mixed polythio ethers, polythioether esters or polythio ether ester amides, depending on the co-component.

Suitable polyacetals are e.g. the compounds which can be prepared from glycols such as diethylene glycol, triethylene glycol, 4,4'-dioxethoxy-diphenyldimethylmethane, hexanediol and formaldehyde. Polyacetals suitable for the purpose of the invention may also be prepared by the polymerisation of cyclic acetals.

Suitable polycarbonates with hydroxyl groups include, e.g. those which can be prepared by reacting diode such as propane-1,3-diol, butane-1,4-diol and/or hexane-1,6-diol, diethylene glycol, triethylene glycol, tetraethylene glycol and optionally 2,2-bis-(4-hydroxyphenyl)-propane and/or the corresponding hydrogenated compound with phosgene or preferably with diaryl carbonates, e.g. diphenyl carbonate.

Suitable polyester amides and polyamides include e.g. the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups and modified or unmodified natural polyols such as castor oil, carbohydrates or starch are also suitable. Products of addition of alkylene oxide to phenol formaldehyde resins or to urea formaldehyde resins may also be used according to the invention.

Other examples of compounds which may be used for carrying out the process of the invention have been described e.g. in High Polymers, Volume XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199, and in Kunststoff-Handbuch, Volume VII, Vieweg-Höchtlen, Carl-Hanser-Verlag, Munich 1966, e.g. on pages 45–71.

The process according to the invention may also be carried out with mixtures of any of the above mentioned polyhydroxyl compounds, e.g. mixtures of polycarbonates with polyesters or mixtures of polyethers, polycarbonates and polyacetals. Ethylene glycol, propylene-1,2- and 1,3-glycol, butylene-1,4- and -2,3-glycol, hexane-1,6-diol, octane-1,8-diol, neopentyl glycol, cyclohexane dimethanol (1,4-bis-hydroxymethyl cyclohexane), 2-methyl-propane-1,3-diol, xylylene glycol, pentane-1,5-diol, hexane-1,6-diol, hydroquinone-bis-hydroxyethylether, diethylene glycol and triethylene glycol are examples of suitable low-molecular weight glycols with a molecular weight of up to 300.

These chain-lengthening agents preferably contain primary OH-groups. Triols such as trimethylolpropane, glycerol or hexane-1,2-6-triol, which generally have molecular weights of up to 500, may also be included.

The following are examples of aliphatic diamines which may be used as chain-lengthening agents according to the invention either alone or as mixtures: ethylene diamine, tetramethylene-1, 4-diamine, hexamethylene-1,6-diamine, N,N'-diisobutyl-hexamethyle-1,6-diamine, undecamethylene-1,11-diamine, dodecamethylene-1,12-diamine, cyclobutane-1,3-diamine, cyclohexane-1,3- and -1,4-diamine and mixtures thereof, 1-amino-3,5,5-trimethyl-5-aminomethyl cyclohexane, hexahydrotolylene-2,4- and -2,6-diamine and mixtures thereof, perhydro-2,4'- and -4,4'-diaminodiphenylmethane, p-xylylene diamine, bis-(3-aminopropyl)-methylamine, etc. Hydrazine and substituted hydrazines such as methyl hydrazne, N,N'-dimethyl hydrazine and their homologs as well as acid dihydrazides may also be used according to the invention e.g. carbodihydrazide, oxalic acid dihydrazide, the dihydrazide of malonic acid, succinic acid, glutaric acid, adipic acid, β-methyl adipic acid, sebacic acid, hydracrylic acid and terephthalic acid, semicarbazido-alkylene hydrazides such as β-semicarbazido-propionic acid hydrazide (DOS 1,770,591), semicarbazido-alkylene carbazic acid esters such as 2-semicarbazido-ethyl-carbazic ester (DOS 1,918,504) or also amino semicarbazido compounds such as β-aminoethyl-semicarbazido carbonate (DOS 1,902,931).

Higher-functional amines may also be added and used in analogous manner to the higher-functional isocyanates.

Suitable examples of aromatic diamines include the bisanthranilic acid esters according to German Offenlegungsschriften 2,040,644 and 2,160,590, 3,5- and 2,4-diaminobenzoic acid esters according to DOS 2,025,900, the diamines with ester groups described in German Offenlegungsschriften 1,803,635, 2,040,650 and 2160 589, and 3,3'-dichloro-4,4'-diaminodiphenylmethane, tolylene diamine, 4,4'-diaminodiphenylmethane and 4,4'-diaminodiphenyl disulphide.

Compounds which are monofunctional in their reaction with isocyanates may also be used as so-called chain breaking agents in proportions of 0.01 to 10 % by weight, based on the polyurethane solids content. Monofunctional compounds of this kind include e.g. monoamines such as butylamine and dibutylamine, octylamine, stearylamine, N-methyl stearylamine, pyrrolidine, piperidine and cyclohexylamine, monoalcohols such as butanol, 2-ethyl hexanol, octanol and dedecanol, the various amyl alcohols, cyclohexanol, ethylene glycol monoethyl ether, etc.

As already mentioned above, the average functionality of all the components used for the reaction should not be substantially greater than 2 in order to ensure that elastomeric polyurethanes which are still fusible or thermoplastic will be obtained during the reaction in the screw extruder.

In the process according to the invention, the NCO-groups and OH- and/or NH-groups present are preferably kept in about stoichiometric proportions. The proportion of NCO to (OH+ NH) is generally between 0.8 and 1.3, preferably between 0.97 and 1.10, although it may, of course, deviate slightly from these values.

The molar ratio of higher-molecular weight compounds which contain Zerewitinoff-active groups to chain-lengthening agents, i.e. low-molecular weight aliphatic diamines and optionally aromatic diamines and or low-molecular weight diols and/or polyols, is generally between 10:1 and 1:20, preferably between 5:2 and 1:15.

The sequence in which the various reactants are reacted with the diisocyanate and optional polyisocyanate is open to choice. The reaction may be carried out by a one-stage or multistage process but when producing polyurethane ureas it is advantageous if the reaction with the hydroxyl-containing compound or compounds is carried out not much later and preferably before or during the reaction with the diamines. For example, the individual reactants may be introduced into the screw extruder at different points. According to a preferred embodiment of the process, an NCO-prepolymer is first prepared in another mixing vessel and/or reaction vessel, e.g. a tank or also in a mixing head, static mixer or mixing nozzle from the diisocyanate and optional polyisocyanate and the higher-molecular weight compound or compounds containing an average of at least 1.8 Zerewitinoff-active groups in the molecule and optionally part of the chain extending agents, i.e. lower molecular weight dialcohols and/or polyalcohols and/or aromatic diamines. This prepolymer is then mixed with the remainder of the chain extenders and optionally monofunctional compounds and introduced into the multi-screw extruder.

A major advantage of the process according to the invention compared with the discontinuous method previously employed is that it may also be carried out as a one-shot process. In a static reaction vessel, e.g. a tank, it is generally not possible in particular to react polyisocyanates, polyols and polyamines simultaneously because polyisocyanates and polyamines rapidly react to form ureas which are insoluble in the reaction mixture, precipitate and result in inhomogeneities in the end product.

When aliphatic diamines are used as chain extenders, optionally low-molecular weight diols and/or polyols, aromatic diamines and mono-functional chain-breaking agents may first be mixed either with the higher-molecular weight compounds which contain Zerewitinoff-active groups or with the aliphatic diamines or polyisocyanates, or they may be added separately to the reaction mixture.

In another embodiment of the process according to the invention, higher-molecular weight compounds which contain aliphatically bound amino end groups (so-called amino prepolymers are used as starting materials which are reacted with the diisocyanates and optionally polyisocyanates in the screw extruder, the isocyanate component acting as chain-lengthening agent. Amino prepolymers of this kind may be prepared e.g. by reacting diamines and/or polyamines with a subequivalent amount of diisocyanates or by hydrazinolysis of monoaryl carbonates of the polyesters or polyethers described above. A detailed description of the preparation of amino prepolymers which may be used according to the invention may be found e.g. in DOS 1 694, 152 (U.S. Pat. No. 3,625,871).

The process according to the invention is preferably carried out in the presence of lubricants which reduce the tendency of the reaction mixture to stick to the screws and the walls of multiscrew extruders. The substances used are known lubricants or mold-parting agents.

Thus, for example, natural and synthetic derivatives of fatty acids may be used for the process. Amides of $C_8$–$C_{20}$ monocarboxylic acids such as dodecylamide, decylamide, oleylamide or stearylamide used in quantities of about 0.3 to 5% are particularly suitable. Diamides of aliphatic monocarboxylic acids which contain more than 9 carbon atoms and aromatic or aliphatic diamines such as phenylene-bis-palmitylamide or ethylene-bis-stearylamide are also very suitable. Other examples which may be mentioned are esters of fatty acids, preferably with more than 10 carbon atoms, such as the methyl and butyl esters of palmitic acid or of stearic acid, and glycerides of carboxylic acids which contain more than 8 carbon atoms. Polyethylene waxes and synthetic waxes, montan waxes and mixtures thereof may also be used. The preferred lubricant used in the process according to the invention consists of 0.3 to 5% by weight (based on the polyurethane solids) of derivatives of fatty acids which contain more than 12 carbon atoms, e.g. esters or amides of these fatty acids. Another method of carrying out the process of the invention consists in reacting the components in the presence of organic inert solvents such as peralkylated acid amides, esters, ethers, ketones, hydrocarbons or halogenated hydrocarbons. Suitable solvents are e.g. butyl acetate, methyl ethyl ketone, chlorobenzene, decalin and acetone.

The reaction of isocyanate groups with other reactants optionally may be accelerated with the usual catalysts for isocyanate reactions in quantities of 0.0001 to 5% by weight, preferably 0.0005–2% by weight (based on the polyurethane solid content). Suitable catalysts are e.g. tertiary amines such as triethylamine, N-methyl morpholine, N,N,N',N'-tetramethyl-ethylene diamine, 1,4-diazabicyclo-(2,2,2)-octane, N,N-dimethyl benzylamine, 2-methyl imidazole etc., organic metal compounds such as zinc octoate, tin(II)-octoate, dibutyl tin(IV)-dilaurate, iron acetyl acetonate, titanium tetrabutylate, dioctyl tin(IV)diacetate etc., and bases such as tetraalkyl ammonium hydroxides, sodium hydroxide, sodium phenolate, etc. In particular for the reaction of aliphatic diamines with diisocyanates and optionally polyisocyanates, however, a catalyst is not required.

Other representatives of catalysts which may be used according to the invention and details concerning the action of the catalysts are described in Kunststoff-Handbuch, Volume VII, published by Vieweg and Höchtlen, Carl-Hanser-Verlag, Munich 1966, e.g. on pages 96 to 102.

The reactants may be measured out by known methods, e.g. using gear wheel, membrane or piston pumps, and if desired they may be mixed in a suitable mixing head before they are introduced into the extruder.

The reactants are introduced into a commercial multiscrew extruder known per se, either singly or as mixtures. Suitable extruders are e.g. self-cleaning two-shaft screw extruders with both shafts rotating in the same sense (such as, for example, the screws 1 in FIG. 1) and having zonewise heating or cooling of the housing (2–6 of FIG. 1) e.g. by means of a liquid heating medium. If the reactants mentioned above are continuously reacted together in a single screw or multi-screw extruder without the special measures according to the invention, then the melt extruded from the screw always contains jelly-like lumps. These irregularities are due to parts of the reaction mixture adhering to the shafts of the screw and walls of the housing (even in the case of multi-shaft extruders with intermeshing screws within the technically necessary clearances) and remaining there for some time while the reaction mixture is in a critical phase of its reaction in the viscosity range of between 100 and 1000 Poises, in particular 200 and 700 Poises, when it is very sticky. These particles, which are different from the main mass of substance as regards their residence time in the extruder and reaction history and hence also in their properties, subsequently become detached by accident and incorporated in the elastomer.

To prevent this formation of lumps in the process according to the invention, the reaction mixture is subjected to a high velocity gradient (more than 2000 sec$^{-1}$, preferably 3000 to 5000 sec$^{-1}$, in the clearance between the screws and the wall of the housing) while it is still a relatively low viscosity melt in the critical phase of reaction defined above (viscosity between about 100 and 1000 Poises, in particular 200 and 700 Poises), and at the same time it is rhythmically kneaded about 1 to 20 times, preferably 5 to 15 times, more preferably 7 to 15 times, per second by means of the kneading elements.

When diamine chain extenders are used, the process according to the invention is carried out at a relatively high temperature, a temperature above the softening point of the elastomeric polyurea formed in the extruder being employed even at the beginning of the screw.

These measures causes the substance to be so vigorously mixed in the radial direction that the reaction proceeds homogeneously and the substance is prevented from adhering to the shafts of the screws and walls of the housing. The reaction is preferably carried out in self-cleaning, two-shaft screw extruders with the screw shafts rotating in the same direction and with the usual radial clearances of 0.05–0.6 mm, depending on the size of the screws, the reaction being carried out at temperatures of between 90° and 280°C and with screw rotation speeds of over 70 revs per min. Thus, for example, in such a two-shaft screw extruder in which the screws have an external diameter of 53 mm and a radial clearance of 0.2 mm, it is found that the process can be carried out successfully with a speed of screw rotation of e.g. 210 to 300 revs per min, the maximum velocity gradient in the sheared product being then 2920 to 4170 sec$^{-1}$ between the external diameter of the screw and the housing, that is to say calculated in the radial clearance. Suitable kneading elements have been described, for example, in DBP No. 813,154 and DBP No. 940,109 and are also shown in FIGS. 2–6 which represent cross-sectional views of prismatic discs of various geometrical forms which rub against each other in every position except for the small clearance which is mechanically necessary, and co-operate with the ribs of the housing (18, 19 of FIGS. 2–6) to exert high shearing and frictional forces on the material which is being mixed. Several such kneading discs staggered on the shaft in the circumferential direction together form a kneading zone (7, 8, 9 in FIG. 1).

Since such a kneading zone generally hinders the flow of substances passing continuously through the extruder housing in the axial direction, it must be preceded by a self-cleaning screw conveyor zone 10, 11, 12, as shown in FIG. 1, in which the pressure is built up. The geometry of such a conveyor zone has been described e.g. in DBP No. 862,668.

For producing polyureas from isocyanates and aliphatic amines zone 10 should be as short as possible so that the time of stay of the reaction mixture in this zone is preferably only about 1 to 10 seconds.

The critical stage of the reaction, in which the reaction mixture is particularly sticky and therefore forms lumps in the known processes, in any case is situated in the first kneading zone 7 where the formation of lumps is prevented by the mixing conditions mentioned above. The relatively low viscosity mixture of reactants (viscosity approximately 0.1 to 1 Poise, depending on the starting compounds, preferably about 0.5 Poise) as well as the highly viscous product in a later stage of the reaction (final viscosity up to 3000, preferably up to 1600 Poises) can be handled in the screw conveyor zones 10, 11, 12 or 13 without reduction in quality. The critical stage of the reaction however, must be localized in the kneading zone 7 by suitably controlling the temperature in the zones of the housing 2, 3 and if necessary by adding reaction accelerating activators. When only polyols are used as chain extending agents, the delivery of the substance to the kneading zone in which the reaction begins is preferably effected by a screw conveyor zone arranged before it.

Kneading discs arranged in the form of a screw thread and staggered like a spiral staircase as shown in FIG. 7 have also been found to be suitable for the process of the invention. In addition to the desired mixing action in the radial direction they also have a conveying action in the axial direction so that the screw conveyor zone 10 and kneading zone 7 in FIG. 1 may be replaced by a conveying kneading zone as shown in FIG. 7.

According to another preferred embodiment of the invention, delivery of the reacting substance to the kneading zone, which in this case is situated at the beginning of the machine, is effected by means of a hydraulic bias pressure produced by the delivery pumps used for the reactants. The liquid required for this purpose is pumped into the closed machine.

Here again there is the alternative of either mixing the components in a mixing head or mixing nozzle before they are introduced into the screw extruder or feeding them separately into the extruder at one or more points so that they are only subsequently mixed by the vigorous mixing action in the screw.

When aliphatic diamines are used, however, it is essential for carrying out the process according to the invention that the di- or polyisocyanate and aliphatic diamine should immediately be vigorously mixed as soon as they are brought together in the screw extruder, preferably at a temperature above the softening point of the product delivered from the extruder.

Owing to the great speed with which they react, the isocyanate component and amino component generally cannot be mixed beforehand but must be introduced separately into the screw extruder. As already mentioned above, the time interval between mixing of the reactants and onset of the critical reaction phase is of the order of 1 to 10 seconds. It is therefore necessary to ensure rapid and vigorous mixing of the components and a sufficiently short time of stay of the mixture in the extruder before it enters the kneading zone which is an essential part of the invention.

The kneading zones 8 and 9 shown in FIG. 1 behind the all-important first kneading zone 7 which prevents the formation of lumps serve to homogenize the substance towards the end of the reaction but they are of less importance (for example, homogeneous products free from lumps can also be obtained when 9 is omitted); they are important in cases when additives have to be mixed with the polyurethane. The kneading zones 7, 8 and 9 whose properties are described above operate particularly intensively if they are kept constantly filled with substance by means of small screws or kneading zones 14, 15, 16 which are arranged at their outflow ends and tend to convey the mixture backwards. The stream of substance which is directed as described above (by screw threading, conveyor kneading elements or hydraulic pressure) flows over these small elements which act as obstructions to the flow.

As already explained above, kneading discs, small screw clearances and high screw rotation speeds, i.e. high velocity gradients, are necessary to prevent the formation of lumps during the critical reaction phase when the substance is in the viscosity range of between about 200 and 700 Poises. In the highly viscous melt which has completed its reaction at the end of the machine as well as earlier, in the screw conveyor zone 13, however, this same high speed of rotation causes considerable production of heat due to internal friction. Cooling is, therefore, necessary at the latest in zone 6 of the housing in order to prevent overheating of the substance. The temperature of the product should not exceed 280° and preferably not 260°C. Another measure to prevent overheating is to increase the screw clearance which, als already mentioned above, must be kept as small as possible earlier on in the zone of the critical reaction stage where the substance is sticky. To prevent overheating in large machines, a single-shaft screw which rotates only slowly and, therefore, produces little heat of friction should be directly attached to the downstream end of a high-speed two-shaft screw machine with kneading elements, the two-shaft screw machine ensuring a homogeneous reaction until the substance has passed its critical stage while the single-shaft screw is used for the remainder of the reaction and for ejecting the finished melt through a molding tool. It is, therefore, advantageous if the reaction of the components is carried out in a two-shaft screw extruder which has a very small radial clearance between screws and housing in the section where the reaction takes place, but larger radial clearances in the extrusion section or if the reaction of components to produce a product free from lumps is carried out in self-cleaning, two-shaft, high-speed screw extruder with kneading elements in the critical reaction zone while the remainder of the reaction and extrusion of the finished melt through a molding tool are carried out in a slowly rotating single-shaft screw directly attached to the two-shaft screw.

According to the invention, dyes or other additives e.g. mold-parting agents, fillers, reinforcements or thermoplasts may be added to the product in the screw extruder during or after the reaction.

If desired, the melt in the screw extruder may also be freed from volatile constituents by degasification in known manner.

After residence times in the screw extruder generally amounting to 0.8–4 minutes at temperatures of between about 90° and 280°C, preferably 110° and 260°C, the reacted melt is extruded at the end of the machine through a molding tool, preferably an apertured die 17. Other molding tools may also be attached in conventional manner, e.g. slot dies, profile-forming dies, tube-forming dies or cable sheathing heads. The extruded polyurethanes may be cooled in known manner by means of cooling rollers, cooling baths or air. The products of the process normally require no finishing treatment because in the new process they are produced within a narrow range of residence times with continuous mixing and very accurate temperature control and the exclusion of atmospheric moisture. They are therefore, of superior quality in their mechanical strength and other properties. The products may, however, be subsequently shaped by a thermoplastic process, for exammple by deep-drawing or blowing the foils, panels or strands. They may also be size-reduced and subsequently worked up in solution or thermoplastically in injection molding or extrusion machines if the elastomers have been produced mainly from linear difunctional starting materials. In this way, manufacturing waste such as the waste from punching processes can be worked up and re-used.

To produce a granulate for injection molding or extrusion, the reacted polyurethane melt discharged from the screw through an apertured die in the form of strands can be cooled in water until it has solidified on the outside and is no longer sticky and then the water adhering to it on the outside is evaporated off in air by the heat supplied from the outside of the strand, and the strand is then cut up into granules. The water content is then less than 0.05%. Alternatively, the melt discharged through a perforated plate at the end of the screw may be granulated under water by a rotating knife and then solidified in water. The granules are then immediately freed from the water adhering to them by introducing them into a centrifuge or drying them with air in a dryer.

The products of the process have numerous applications, e.g. as machine elements such as gear wheels, sleeves, cable sheaths, tubes, seals and bearing cups.

The products of the process may also be used either solvent-free or in the form of solutions for elastic coatings, e.g. for textiles, leather, split leather or synthetic resins or they may be used as sheetings. The possible uses of the products are known per se.

The products of the process may also be dissolved by the usual organic solvents such as esters, ketones, acid amides, aliphatic or aromatic hydrocarbons, halogenated hydrocarbons, alcohols or ethers, used either singly or as mixtures.

The invention may be better understood by referring to the examples that follow. In the examples all parts and percentages are by weight unless otherwise specified.

EXAMPLES

Example 1a: (comparison)

A mixture was prepared from 100 parts by weight of a polyester from adipic acid and butane-1,4-diol (OH-numbr 51.65), 9.5 parts by weight of butane-1,4-diol, 1.6 parts by weight of oleylamide and 1 part by weight of a 2,2′,6,6′-tetraisopropyldiphenylcarbodiimide. This polyol mixture was heated to 100°C and delivered to a mixing nozzle through gear wheel pumps. Melted 4,4′diisocyantodiphenylmethane was delivered to the same mixing head through a second pump. 35 g of diisocyanate were added to every 100 g of the polyol mixture. The low-viscosity reaction mixture left the mixing apparatus at the temperature of 90°–120°C and flowed directly into a two-shaft screw extruder (ZSK-53 by Werner & Pfleiderer, Germany) containing screws with a length of 1855 mm, external diameter of 53 mm and radial clearance of 0.2 mm which both rotated in the same direction. The screws were composed of screw zones of differing pitches. The temperature of the extruder was controlled by an external heating or cooling medium. The temperature was kept at 95°–105°C in the zone of product inlet, 180°–260°C in the middle of the extruder and 100°–180°C in the last section of the extruder. The screws were rotated at speeds of 70–300 revs per min. A broad sheeting die 100 mm in width with a gap of 3 mm in height was flanged to the end of the reaction screw. The transparent band extruded through this head contained numerous jelly-like inclusions and was, therefore, unsuitable for technical use. The mechanical properties of this product are indicated in Example 1d.

Example 1b: (comparison)

The same reaction mixture as in Example 1a was introduced into a two-shaft screw extruder with screws of the same dimensions as in Example 1a both rotating in the same sence. This experiment differed from experiment 1a in that the screws were equipped with a kneading zone (of the type shown in FIG. 6) in the last third of the extruder indicted by the numeral 9 in FIG. 1. It was expected that the kneading elements installed in the two-shaft extruders would subsequently break down the jelly-like inclusions. The other conditions of the process were the same as in Example 1a. Contrary to expectations, however, the band discharged from the broad sheeting die had a high degree of inhomogeneity and was contaminated with numerous jelly-like inclusions and therefore technically unusable.

Example 1c: (process process according to the invention)

The process was carried out in the same way as in Example 1b but the two-shaft extruder was equipped with an additional kneading zone. Each kneading Zone had a length of 240 mm. The kneading elements were situated in positions 8 and 9 indicated in FIG. 1. The other conditions of the process were the same as before. The speed of the screws was adjusted to 300 revs per min. (corresponding to a kneading frequency of 15 Hertz); the velocity gradient was 4170 sec$^{-1}$. The band discharged from the broad sheeting die was full of inhomogeneities in the same way as in Examples 1a and 1b.

This experiment which gave rise to an inhomogeneous product was repeated but with the critical reaction stage transferred to the kneading zone in position 8. This was achieved by switching off the heating in zone 3 so that the temperature of the reaction mixture entering the screw was at first kept constant. The result was surprising. A completely homogeneous melt free from lumps was immediately obtained.

Example 1d: (process according to the invention)

The process was carried out in the same way as in Example 1c but the two-shaft extruder described above was in addition equipped with a third kneading zone (as shown in position 7 in FIG. 1) and operated at a speed of rotation of 300 revs per min (kneading frequency: 15 Hertz; velocity gradient: 4170 sec$^{-1}$) with the heating conditions described in Example 1a.

The other conditions of the process were not changed. The band discharged from the broad sheeting dies was transparent, free from lumps, completely homogeneous and of high technical quality.

The viscosity of the reaction mixture in the extruder varied as follows (where the numbers in perentheses refer to the zones showed in FIG. 1):

Screw inlet: approximately 0.5 Poise
Entry into kneading zone (7): 200 Poises
Exit from kneading zone (7): 700 Poises
Entry into kneading zone (8): approximately 1000 Poises
Exit from kneading zone (8): approximately 1300 Poises
Entry into kneading zone (9): approximately 1400 Poises -continued

| | | |
|---|---|---|
| Exit from kneading zone (9): | approximately | 1500 Poises |
| Extrusion die (17): | | 1520 Poises. |

The rates of throughput in experiments 1a to 1d were varied between 30 and 100 kg/h. The corresponding average residence times of substance in the screw extruder were between 2.5 and 0.8 min. The material obtained in experiment 1d was free from lumps even when high rates of throughput were employed. The specific net energy requirement per kg of material passed through the machine was 0.05 to 0.15 kWh/kg.

The superority of the process according to the invention is also manifested in the mechanical strength of the products. Whereas the tensile strength of the products obtained in experiments 1a to 1c varied between 350 and 480 kp/cm$^2$, the products obtained in Example 1d were found to have a tensile strength of 490–510 kp/cm$^2$. Similar results were obtained for the elongation at break and tear propagation resistance. In experiments 1a to 1c, the elongation at break varied from 500 to 600% as compared with 610 to 620% in experiment 1d. The values obtained for tear propagation resistance were between 46 and 70 kp/cm in experiments 1a to 1c but between 80 and 90 kp/cm in experiment 1d. This narrow range, which lies within the limits of accuracy of measurement, is evidence for the uniformity of the product. The values obtained for the Shore hardness, elasticity and abrasion were uniform in the products obtained in Examples 1a, 1c and 1d and equal within the limits of error of measurement.

Example 2a: (comparison)

The process was carried out in the same way as in Example 1a but instead of the broad sheeting die, a conventional cross-head for sheating wires was used. In addition, 2% (based on the quantity of reaction mixture fed in) of a 20% dispersion of carbon black and dioctyl phthalate was introduced approximately at the middle of the two-shaft screw. A copper wire 2 mm in diameter was passed thorugh the cross-head and covered with a layer of elastomer. The cable obtained in this way had numerous surface irregularities due to the presence of gel particles and was therefore unsuitable for technical use.

Example 2b: (process according to the invention)

The process was carried out in the same way as in Example 1d, a cross-head was used as in Example 2a and the dispersion of carbon black in dioctyl phthalate was introduced between the kneading zones in positions 7 and 8, i.e. at the level of position 11. The cable withdrawn from the end of the cross-head was uniformly black in color and had a glossy, smooth surface.

Example 3a: (comparison)

prepolymer was prepared in a vessel equipped with stirrer from 950 parts by weight of a linear polypropylene glycol ether of polypropylene oxide and butane-1,4-diol (OH number 56), 50 parts by weight of a trifunctional polypropylene glycol ether (OH number 56.2) obtained from propylene oxide and trimethylolpropane, and 15 parts by weight of stearylamide, 15 parts by weight of 2,2',6,6'-tetraisopropyl-diphenylcarbodiimide and 1700 parts by weight of 4,4'-diisocyanatodiphenylmethane by heating the mixture to 95°C for half an hour. A diol mixture was prepared in a second vessel equipped with stirrer from 1000 parts by weight of a polyester of adipic acid and ethanediol (OH number 56.1) 500 parts by weight of butane-1,4-diol and 20 parts by weight of a carbon black dye and 20 parts by weight of methyl stearate. The prepolymer was delivered to a mixing head at a temperature of 90°–95°C and the polyol mixture at a temperature of 70°–80°C, using gear wheel pumps. The reactive mixture flowed straight from this mixing apparatus into the two-shaft screw extruder described in Example 1a. The other conditions of the process were the same as in Example 1a. The band discharged from the broad sheeting die was very inhomogeneous and permeated with numerous jelly-like impurities. It was, therefore, cut up in a cutting mill and worked up again in a single-shaft extruder. The extruded band produced this time, which was 20 cm in width and 1mm in thickness, also had numerous irregularities and was permeated with jelly-like particles. Only a slight improvement in the product was obtained by installing sieve strainers in the single-shaft extruder.

Example 3b: (process according to the invention)

A prepolymer and a diol mixture were prepared as in Example 3a and fed into the mixing head, the prepolymer at the rate of 24.65 kg per hour and the diol mixture at the rate of 13.9 kg per hour. The reactive mixture flowed directly into the extruder described in Example 1d. The temperature control and other conditions of the extruder were the same as in Example 1d. The band which was drawn off the broad sheeting die and passed through a bath of cooling water before being wound on to a winding apparatus was homogeneous and of good surface quality. The material was subsequently granulated in a cutting mill and made up into a band 20 mm in width and 1 mm in thickness in a single-screw extruder.

This band was also homogeneous and had a high surface gloss. The granulates were also made up into test samples by injection molding. The test samples were found to have the following properties:

| | |
|---|---|
| Tensile strength | 325 kp/cm$^2$ |
| Elongation at break | 312% |
| Tear propagation resistance | 97 kp/cm |
| Abrasion | 42 mm$^3$ |
| Shore hardness A | 95 |
| Shore hardness D | 50 |

Example 4: (process according to the invention)

Kneading elements were installed in positions 7, 8 and 9 of FIG. 1 in a two-shaft extruder which had the same dimensions as the extruder in Example 1a and contained screws rotating in the same sense. This extruder was operated at a speed of rotation of 300 revs per min and heated as follows: zone 2= 110°C, zone 3= 180°C. zones 4 and 5= 200°C, zone 6= 120°C. The molding tool used was a die plate with eight apertures 4 mm in diameter. The following components were fed into this screw by means of dosing pumps at the rates per minute indicated below.

276 g of a polyester from adipic acid and an equimolecular mixture of butane 1,4-diol and ethanediol (OH-number 55,6, acid number 0.6), 26.2 g of butane-1,4-diol, 2.7 g of distearylamide of ethylenediamine and 112 g of 4,4'-diisocyanatodiphenylmethane. To simplify the correct rate of addition of the various components, the polyester, butanediol and distearylamide of ethylenediamine were previously mixed and heated to 100°C. The diisocyanate was pumped in as a melt at 60°C. In addition, 25 kg per hour of a commercial polyoxymethylene in the form of a granulate was fed into the screw between the second and third kneading zone, i.e. in zone 12 of FIG. 1, from a vibrating chute. (To achieve higher rates of throughput, however, the polyoxymethylene could first be plasticized in a second extruder attached to the side of the first extruder and then pumped as melt into the reaction screw). The extruded material leaving the end of the extruder was drawn off in the form of strands of circular cross-section over a wire grid band, cooled by a stream of air and then reduced to pellets in a granulator.

The granulates obtained were made up into test samples in an injection molding machine. The temperatures employed were between 180° and 200°C. The standard test rods S 1 (according DIN 53 50) produced in this way had a tensile strength of 302 kg.wt/cm². The elongation at break was 522%. The modulus for 100% elongation was found to be 274 kp/cm² and the Shore hardness D was 65. The recoil elasticity was found to be 45% and the abrasion of the material was only 50% of that of a high-quality natural rubber mixture.

Example 5a: (comparison)

The process was carried out as described in Example 1a except that only 33 g of 4,4'-diisocyanatodiphenylmethane were added to 100 g of polyol mixture. The resulting polyurethane was granulated and dissolved in a mixture of dimethylformamide and methyl ethyl ketone (1:1). The 20% solution prepared in this way contained jelly-like particles. When the solution was painted on glass plates, a transparent film permeated with gel particles was obtained.

Example 5b: (process according to the invention)

The process was carried out in the same way as in Example 1d, except that only 33 g of 4,4'-diisocyanatodiphenylmethane were used for 100 g of the polyol mixture. The solution prepared as in 5a was clear and free from jelly-like particles. The layer of film obtained after evaporation was homogeneous. The polyurethane elastomer obtained is, therefore, eminently suitable for application from solutions and for coating substrates.

The self-cleaning, two-shaft screw extruder with both screws rotating in the same direction used in the following examples which demonstrate the production of polyurethane ureas was a ZDSK 53 model of Werner & Pfleiderer which had the following dimensions: Shaft diameter D = 53 mm; length of shaft = 30 D; length of kneading zone: 240 mm each; radial clearance: approximately 0.1 mm; speed of rotation: 200 to 210 (example 10:100, example 8:300) per minute; kneading frequency: 10 Hertz, but 15 Hertz in example 8 and 5 Hertz in example 10.

The elements mounted on the shafts were substantially as shown in FIG. 1 but the screw delivery zone 10 was only about half as long as indicated in FIG. 1. The time of stay in the machine was on an average about 0.8–2 min.

Example 6

A. A prepolymer containing 4.5 % of free isocyanate groups was prepared from 69.2 parts of an anhydrous linear polyester from adipic acid, hexane diol and 2,2-dimethyl propanediol-(1,3) (neopentyl glycol) with an average molecular weight of 1700 and 20.5 parts of 1-isocyanato-3-isocyanatomethyl-3,5,5-trimethyl cyclohexane by heating to 80°C with stirring under a stream of nitrogen for 3 hours. The prepolymer was stored at 80°C under nitrogen until ready for use.

B. The product from (A) was taken from a tank where it was stored under nitrogen at 80°C and delivered through a gear wheel pump at the rate of 260 parts per minute into the inlet pipe of a two-shaft screw extruder with both shafts rotating in the same direction at 200 revs. per min. and at the same time 1-amino-3-aminomethyl-3,5,5-trimethyl cyclohexane was taken from another tank where it was stored at 30°C and delivered into the inlet of the screw extruder by way of a one-cylinder membrane pump at the rate of a. 26.3 parts per minute,
b. 25.0 parts per minute,
c. 24.2 parts per minute,
d. 23.2 parts per minute and
e. 22.8 parts per minute.

The housing of the extruder was heated with a heating medium, and in the case of experiments (d) and (e) with a cooling medium at the end of the housing, so that the temperatures of the products measured over the whole length of the extruder were roughly as follows:

a. 145°–236°C,
b. 205°–242°C,
c. 200°–243°C,
d. 145°–242°C,
e. 110°–240°C.

The lowest temperatures were found to be at or shortly before the perforated plate through which the product was extruded. The strands of product delivered from the extruder were cooled in a water bath, freed from the water adhering to it by means of compressed air and size-reduced in a granulator. The softening range of the reaction product shortly after it had been produced was about 120°–130°C. After 18 hours at 110°C, the elastomer was dissolved to form a 30 % solution in a mixture of 30 parts of toluene, 30 parts of isopropanol and 10 parts of ethylene glycol monoethyl ether. Clear, pale-yellow solutions with the following viscosities were obtained:

a. 3521 cP at 20°C
b. 9170 cP at 20°C
c. 27820 cP at 20°C
d. 56048 cP at 20°C
e. 305000 cP at 20°C.

When solution (c) was painted on glass plates, freed from solvent at 120°C in a vacuum, detached from its support under water and then dried, clear films with a tensile strength of 366 kp/cm² and elongation on tearing of 430 % were obtained.

Example 7

The procedure was the same as in example 6 B and the compositions following were added per minute at 260 parts of the NCO-prepolymer from example 6 A:

a. a mixture of 32.9 parts of 1-amino-3-aminomethyl-3,5,5-trimethyl cyclohexane and 4.97 parts of ethylene glycol monomethyl ether,
b. a mixture of 24.4 parts of 1-amino-3-aminomethyl-3,5,5-trimethyl cyclohexane and 1.22 parts of ethylene glycol monoethyl ether, c. a mixture of 24.2 parts of 1-amino-3-aminomethyl-3,5,5-trimethyl cyclohexane and 0.3 parts of ethylene glycol monoethyl ether.

The approximate temperatures of the product measured over the whole length of the extruder were as follows:
 a. 170° – 235°C
 b. 200° – 250°C
 c. 200° – 240°C.

When the products were dissolved in the solvent mixture described in example 6B, they gave rise to clear, pale-yellow, 30 % solutions which had the following viscosities (measured on the day of production of the resins in the screw extruder):
 a) 4340 cP
 b) 3590 cP at } 20°C
 c) 2500 cP
after 18 hours' storage at 110°C:
 a) 3930 cP
 b) 9480 cP at } 20°C.
 c) 11120 cP

Example 8

A. The procedure was the same as described in example 6 A but using 670.25 parts of an adipic acid butanediol polyester with an OH-number of 52 mg of KOH/g, 30.6 parts of a polydimethyl siloxane which contained methylol end groups and had an OH-number of 198 mgKOH/g and 240.6 parts of 1-isocyanato-3-isocyanatomethyl-3,5,5-trimethyl cyclohexane. A prepolymer which contained 6.28 % of free isocyanate groups was obtained.

B. The procedure was the same as described in example 6 B but 230 parts of the prepolymer described in example 8 A and the following quantities of 1-amino-3-aminomethyl-3,5,5-trimethyl cyclohexane were introduced per minute into the screw extruder:

| | |
|---|---|
| a) 32.5 parts | 1-amino-3-aminomethyl-3,5,5-trimethyl cyclohexane |
| b) 31.4 parts | " |
| c) 30.8 parts | " |
| d) 29.8 parts | " |
| e) 28.7 parts | " |
| f) 28.1 parts | " |

The approximate product temperatures measured during the reaction were between 130° and 250°C. Granulates were obtained which when dissolved to form 30 % solutions in toluene/isopropanol/ethylene glycol monoethyl ether (20:20:21) formed almost clear, pale-yellow solutions which had the following viscosities (determined at 20°C) on the day of production:
 a. 582 cP
 b. 1535 cP
 c. 7490 cP
 d. 2980 cP
 e. 8000 cP
 f. 2810 cP.

Example 9

200.6 parts per minute of the polyester from example 6 A heated to 80°C, 59.4 parts per minute of 1-Isocyanato-3-isocyanatomethyl-3,5,5-trimethyl cyclohexane kept at 30°C and 24.2 parts per minute of 1-amino-3-aminomethyl-3,5,5-trimethyl cyclohexane kept at 30°C were delivered from three separate containers into the screw extruder. The approximate product temperatures measured over the whole length of the extruder housing were between 170° and 230°C. The granulated reaction product was kept at 110°C for 20 hours and then dissolved as described in example 6 B. The clear, pale-yellow, 30 % solution had a viscosity of 24 380 cP at 20°C.

Example 10

A. The procedure was the same as described in example 6A but using 920 parts of a hexanediol polycarbonate with an average molecular weight of 2000 and 238.6 parts of 1-isocyanato-3-isocyanatomethyl-3,5,5-trimethyl cyclohexane. An NCO-prepolymer which contained 3.9 % of free isocyanate groups and was liquid at 80°C was obtained after 3 hours.

B. The procedure was the same as described in example 6 B. 195 parts of the prepolymer described in 10 A and the following quantities of 4,4'-diamino-dicyclohexylmethane were used per minute:
 a. 20.0 parts
 b. 19.5 parts
 c. 18.6 parts
 d. 17.8 parts
 e. 17.5 parts The product temperatures measured in the screw extruder were 200°–250°C. The granulated reaction mixture which softened at 145°C was kept at 110°C for 18 hours and then dissolved in a mixture of toluene, isopropanol and ethylene glycol monoethyl ether (29:20:21). Slightly cloudy 30 % solutions were obtained which had the following viscosities determined at 20°C:
 a. 9480 cP
 b. 11740 cP
 c. 14040 cP
 d. 32800 cP
 e. 5770 cP These solutions gave rise to clear films. The film from solution d was found to have a tensile strength of 376 kp/cm$^2$ and an elongation on tearing of 370 %.

Example 11

A. 715 parts of the hexanediol polycarbonate described in example 10 A
 15.3 parts of N-methyl-N,N-bis-(β-hydroxypropyl)-amine and
 252.65 parts of 1-isocyanato-3-isocyanatomethyl-3,5,5-trimethyl-cyclohexane were reacted together as described in example 6 A. A prepolymer with an NCO-content of 5.10 % was obtained after 3 hours' stirring at 80°C.

B. 284 parts of the prepolymer described in example 11 A were continuously reacted with 26.8 parts of 1,4-diaminocyclohexane per minute in a screw extruder as described in example 6 B. Approximate product temperatures of between 115° and 195°C were measured over the whole length of the extruder. The 30 % solution obtained by dissolving the product in a mixture of tertiary butanol, toluene and ethylene glycol monomethyl ether acetate (50:37:13) after it had been stored at room temperature for 7 days was slightly cloudy and had a viscosity of 198000 cP at 20°C.

Example 12

36.8 Parts of the hexanediol polycarbonate from example 10 A were reacted with 9.54 parts of 1-isocyanato-3-isocyanatomethyl-3,5,5-trimethylcyclohexane as described in example 6A. A prepolymer which contained 4.5 % of free isocyanate groups was obtained. 260 parts of the prepolymer per minute and a. 17.1 parts of 1,4-diaminocyclohexane per minute or
b. 16.2 parts of 1,4-diaminocyclohexane per minute were continuously fed into the screw extruder under the conditions indicated in example 6 B. The approximate product temperatures measured in the extruder were a. 180° – 220°C and
b. 150° – 225°C.

30% solutions obtained by dissolving the products in a mixture of isopropanol, toluene and ethylene glycol monoethyl ether (20:29:21), after they has been stored at 80°C for 24 hours had viscosities of a. 208 cP and
b. 160 cP determined at 20°C.

Example 13

A prepolymer which contained 4.3 % of free NCO-groups was prepared from 57.7 parts of the adipic acid polyester from example 6 A and 19.3 parts of 4,4'-diisocyanato-diphenylmethane as described in example 6 A.

Prepolymer and 1-amino-3-aminomethyl-3,5,5-trimethylcyclohexane were continuously fed into the screw extruder in proportions by weight of a. 2500 : 242
b. 2500 : 229
c. 2500 : 222
d. 2500 : 218
e. 2500 : 214 and
f. 2500 : 209 under the conditions indicated in example 6 B. The approximate product temperatures measured in the screw extruder were between 145° and 230°C, in the cases of e and f between 200° and 230°C. The melts delivered from the extruder were cloudy. 30 % solutions of the products in a mixture of toluene, isopropanol and ethylene glycol monoethyl ether (29:29:12) were thixotropic.

Although the invention has been described with reference to certain specific embodiments thereof, it is to be understood that the scope of the invention is not to be limited thereto. On the contrary, the invention includes all the embodiments included within the definition and spirit of the appended claims.

We claim:

1. In a process for the continuous production of polyurethane (urea) elastomers by simultaneous reaction and extrusion in screw extruders, wherein polyisocyanates, polyols and/or polyamines, optionally other compounds which contain an average of at least 1.8 Zerewitinoff-active groups and optionally a lubricant are
   a. admixed to form a reaction mixture
   b. the reaction mixture is mixed under the action of high shearing forces, and
   c. thereafter, the reaction mixture is formed by extrusion, the improvement comprising kneading the reaction mixture at kneading frequencies of 1 to 20 Hertz and high velocity gradients in the radial clearance between the comb and housing wall of more than 2000 sec$^{-1}$ during the time that the reaction mixture has a viscosity of between 100 Poises and 1000 Poises.

2. In a process for the continuous production of polyurethane elastomers by simultaneous reaction and extrusion in screw extruders, wherein a diisocyanate, a polyhydroxyl compound having a molecular weight of 800 to 3500 and a glycol having a molecular weight of up to 300 and optionally a lubricant are:
   a. admixed to form a reaction mixture,
   b. the reaction mixture is mixed under the action of high shearing forces, and
   c. thereafter, the reaction mixture is formed by extrusion, the improvement comprising kneading the reaction mixture at kneading frequencies of 5 to 20 Hertz and high velocity gradients of more than 2000 sec$^{-1}$ during the time that the reaction mixture has a viscosity of between 200 Poises and 700 Poises.

3. In a process for the continuous production of a polyurethane elastomer by simultaneous reaction and extrusion in a two-shaft screw extruder, which shafts rotate in the same direction; wherein a diisocyanate, a polyhydroxyl compound having a molecular weight of 800 to 3500 and a glycol having a molecular weight of up to 300 — the overall proportion of NCO-groups to OH-groups being between about 0.97 and 1.10 — and optionally a lubricant are mixed and reacted over a temperature range of between about 90°C and about 260°C and viscosities of from 0.1 Poise up to 3000 Poises and by the steps of:
   a. admixing the diisocyanate, polyhydroxyl compound, glycol and lubricant to form a reaction mixture,
   b. mixing the reaction mixture under the action of high shearing forces, and
   c. thereafter, extruding the reaction mixture;

the improvement comprising kneading the reaction mixture at kneading frequencies of 5 to 20 Hertz and high velocity gradients of more than 2000 sec$^{-1}$ during the time that the reaction mixture has a viscosity of between 200 Poises and 700 Poises.

4. Process for the continuous production of elastomeric polyurethane ureas by reacting diisocyanates and optionally polyisocyanates, aliphatic, cycloaliphatic and/or araliphatic primary and/or secondary diamines and optionally other compounds which contain an average of at least 1.8 Zerewitinoff-active groups in self-cleaning two-shaft screw extruders with both the shafts rotating in the same direction, at temperatures between 110° and 280°C and at a viscosity range during the reaction in the screw extruder of about 0.1 to 3000 Poises, characterised in that for the purpose of obtaining a homogeneous end product free from lumps the critical reaction phase, in which the reaction mixture is very sticky and has a viscosity between about 100 and 1000 Poises, is passed through in a zone of the screw which is situated in the front part of the housing and which contains vigorously mixing kneading elements with kneading frequencies of 1 to 20 Hertz and in which there is a velocity gradient in the radical clearance between the comb and housing wall of more than 2000 sec$^{-1}$.

5. The process of claim 4 wherein the diisocyanates used are isocyanate-containing prepolymers from monomeric diisocyanates and polyhydroxyl compounds which have a molecular weight of 500 to 10,000.

6. The process of claims 4 and 5 wherein the diisocyanates and optionally polyisocyanates and the diamine are fed into the screw extruder at different points.

7. The process of claim 1 wherein the kneading is effected in a kneading zone comprising vigorously mixing kneading elements.

8. The process of claim 1 wherein the transport of reactive substance through the kneading zone situated at the beginning of the extruder is effected by a hydraulic bias pressure produced by the feed pumps.

9. The process of claim 1 wherein the reaction mixture is cooled following its kneading at the high velocity gradients and kneading frequencies and prior to its extrusion.

10. The process of claim 3 wherein the reaction mixture includes, in addition to the diisocyanate, polyhydroxyl compound, glycol and lubricant, a triol having a molecular weight of up to 500.

11. The process of claim 1 wherein the lubricant is used in an amount of from about 0.3 to 5 percent by weight, based on the weight of the polyurethane elastomer.

12. The process of claim 11 wherein the lubricant is a derivative of a fatty acid containing more than 12 carbon atoms.

13. The process of claim 3 wherein the admixing is carried out in a mixing chamber equipped with a stirrer which is arranged immediately in front of the extruder.

14. The process of claim 3 wherein the admixing is carried out in a mixing nozzle.

15. The process of claim 3 wherein the diisocyanate, polyhydroxyl compound, glycol and lubricant are fed separately into the screw extruder at one or more points and combined and mixed only after they have been introduced into the screw extruder.

16. The process of claim 1 wherein the kneading zone comprises kneading discs arranged in the form of a screw threading in which the additional discs are staggered in the form of a spiral staircase.

17. The process of claim 3 wherein the mixing is carried out in the two-shaft extruder and the extrusion is carried out in a slowly rotating single-shaft screw directly attached to the two-shaft extruder.

* * * * *